(12) United States Patent
Kato et al.

(10) Patent No.: US 6,336,142 B1
(45) Date of Patent: Jan. 1, 2002

(54) METHODS AND APPARATUS FOR DOWNLOADING DATA BETWEEN AN INFORMATION PROCESSING DEVICE AND AN EXTERNAL DEVICE VIA A WIRELESS COMMUNICATIONS TECHNIQUE

(75) Inventors: Naotaka Kato, Fujisawa; Yoshihisa Kanada, Yokohama, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/487,163

(22) Filed: Jan. 19, 2000

Related U.S. Application Data (63) Continuation of application No. 09/005,962, filed on Jan. 12, 1998, now Pat. No. 6,088,730.

(30) Foreign Application Priority Data

Jun. 2, 1997 (JP) ................................................ 9-143596

(51) Int. Cl.[7] .............................................. G06F 13/00
(52) U.S. Cl. ...................... 709/227; 709/217; 709/232; 709/313
(58) Field of Search ................................ 709/203, 213, 709/217, 219, 223, 227, 228, 225, 232, 237, 313, 328, 329

(56) References Cited

U.S. PATENT DOCUMENTS

| | | | | |
|---|---|---|---|---|
| 5,502,724 A | * | 3/1996 | Chen et al. .................. | 370/445 |
| 5,564,070 A | * | 10/1996 | Want et al. .................. | 455/507 |
| 5,887,063 A | * | 3/1999 | Varadharajan et al. ........ | 380/21 |
| 5,923,757 A | * | 7/1999 | Hocker et al. ................ | 380/21 |

* cited by examiner

*Primary Examiner*—Viet D. Vu
(74) *Attorney, Agent, or Firm*—Paul J. Otterstedt (57) ABSTRACT

To provide an improved information processing apparatus and a method for controlling the same, which enables to smoothly transfer data, such as processed results obtained from execution of an application program, an HTML file acquired from a Web server in accordance with the TCP/IP protocol or the like, to an external device (PDA) by using an infrared communication function. The disclosed information processing apparatus periodically accesses a predetermined server machine (e.g., a Web server) to acquire a desired file (e.g., an HTML file). This file acquisition operation is carried out without the involvement of operations of an infrared transceiver. In other words, the information processing apparatus attempts to continually perform caching of the most recent download data. As a result, when the PDA as an external device is set into an infrared communication mode and a user simply holds the PDA to a station discoverable region of the information processing apparatus, a connection between them is established, thereby enabling the PDA to receive the most recent data.

14 Claims, 5 Drawing Sheets

FIG. 1
PERSONAL COMPUTER 100

METHODS AND APPARATUS FOR DOWNLOADING DATA BETWEEN AN INFORMATION PROCESSING DEVICE AND AN EXTERNAL DEVICE VIA A WIRELESS COMMUNICATIONS TECHNIQUE

This application is a continuation of Ser. No. 09/005,962 filed Jan. 12, 1998 now U.S. Pat. No. 6,088,730.

DETAILED DESCRIPTION OF INVENTION

1. Field of the Invention

This invention relates to an information processing apparatus capable of executing different applications programs such as PIM (Personal Information Manager) software, a Web browser or the like and, more particularly, to an information processing apparatus that has an infrared communication function for exchanging data with an external device such as a PDA (Personal Digital Assistant). More specifically, this invention relates to an information processing apparatus that is capable of smoothly transferring data, such as processed results obtained from execution of an application program, an HTML (HyperText Markup Language) file acquired from a Web server in accordance with the TCP/IP (Transmission Control Protocol/Internet Protocol) protocol or the like, to the external device by using the infrared communication function.

2. Background Art

With the technological revolution in these days, different types of personal computers (PCs), such as desktop, tower, notebook computers, or the like, have been developed and commercially available in the marketplace. As a type of PC that is far smaller than a notebook PC (e.g., palm top type PC), the so-called "PDA" (Personal Digital Assistant) is now widespread in the industry. In general, a PDA is designed to have a much smaller size and a much lighter weight than a notebook PC, thereby to further improve its mobility.

Figure 6:
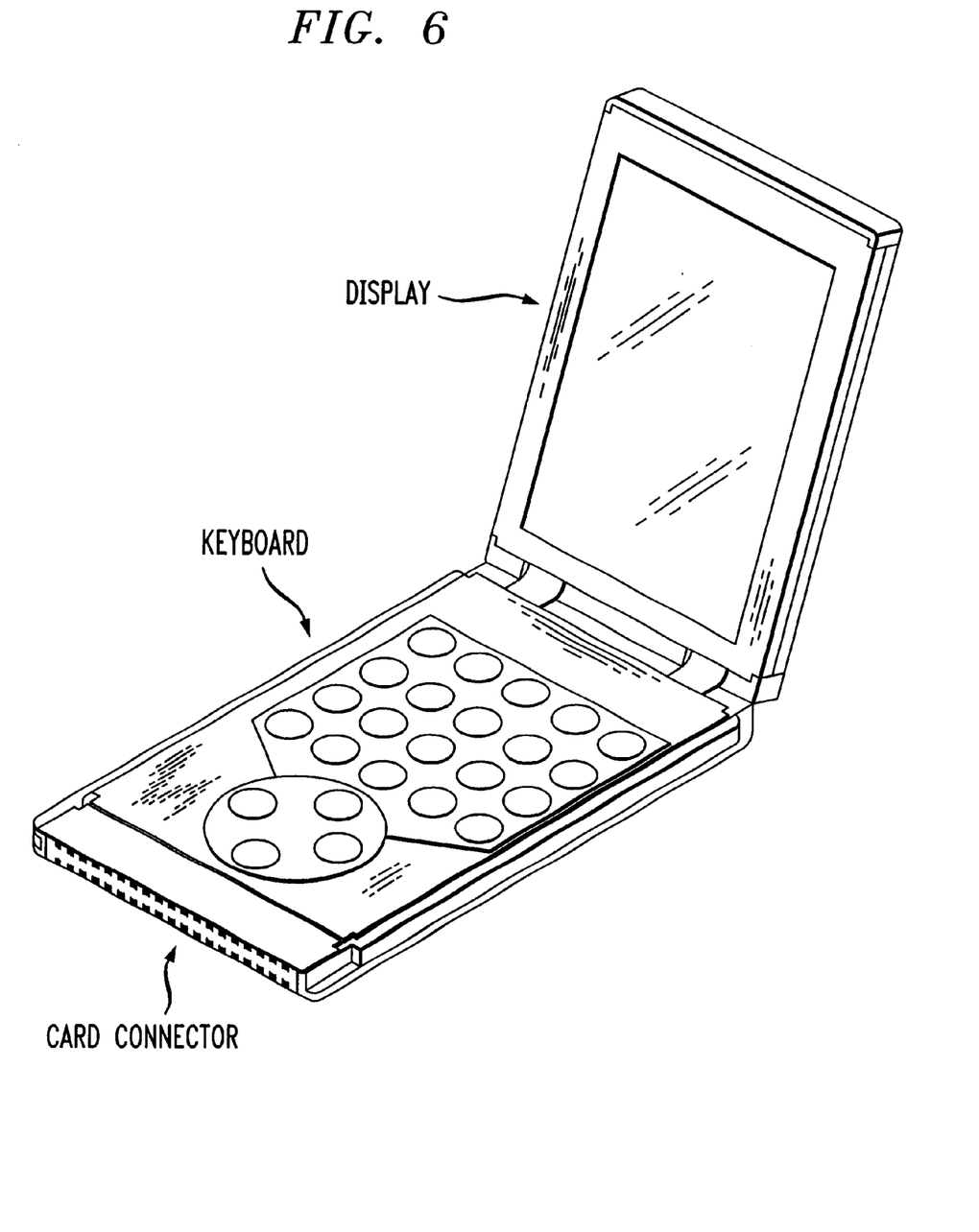
FIG. 6 is a diagram showing an external view of the PC card, "IBM ChipCard VW-200", commercially available from IBM Japan, Ltd.

A typical example of PDAs is a mobile type information processing device called "Newton MessagePad", which has been jointly developed by Apple Computer, Inc. and Sharp Corp. Another example of PDAs is "IBM ChipCard VW-200" (hereafter called "VW-200"), as shown in FIG. 6, which is commercially available from IBM Japan, Ltd. Other examples are the 3com Palm Pilot, and the IBM Workpad.

VW-200 is a PDA of the PC card type, and it comprises a first housing portion that conforms to the form factor of Type-II (5.0 mm×85.6 mm×54.0 mm) defined by PCMCIA (Personal Computer Memory Card International Association)/JEIDA (Japan Electronic Industry Development Association), and a second housing portion that is pivotably hinged on one end of the first housing portion, thereby to form a "foldable structure". The first housing portion can be inserted into a PC card clot provided in a system unit of a notebook PC and, at its another end, there is provided a PCMCIA connector for implementing a mechanical/electrical connection with the system unit of the PC. Further, when the second housing portion is folded on the first housing portion, the whole structure can be inserted into a PC card slot as a Type-III card (10.5 mm×85.6 mm×54.0 mm). On a printed wiring board within the housing portions, there is mounted an internal CPU (16 bit CPU called "TLCS-9001" made by Toshiba Corp.) for coordinating operations of a PDA, in addition to a PCMCIA interface circuit, memories (SRAM, EEPROM, Kanji font ROM or the like). In a case where the first housing portion is inserted into a PC card slot, the internal CPU enters a sleep mode and, thus, VW-200 functions as a conventional memory. On the other hand, when it is detached from a PC card slot, the internal CPU resumes its operations and, thus, VW-200 is now enabled to function as a PDA. As shown in FIG. 6, on the top surface of the first housing portion, a keyboard is provided as an input device for a PDA. Further, on the surface of the second housing portion, a liquid crystal display (200×320 dots (displaying em-sized 12 characters× 20 lines), STN monochrome) is provided.

A primary use of a PDA is to manage and to browse personal information or PIM (Personal Information Manager) data, such as a calendar, a schedule, an address book, a memorandum book or the like. Another use of a PDA is to browse a Web page under a mobile environment. Obviously, an advantage of a PDA is in its excellent mobility. A user of a PDA is capable of easily referencing/updating his/her own PIM information, or browsing a Web page under the mobile environment.

Such data handled by a PDA may be directly edited by a user on a PDA, or there may be another implementation wherein a PDA is automatically connected to a network on its own initiative, thereby to directly acquire an HTML file from a Web server. However, a PDA is much smaller than a notebook PC and, in proportion to its size, its display as an output device and its keyboard/tablet as an input device have to be smaller in size. In other words, its working environment for inputting/editing is not deemed rich enough. Further, any substantial PIM software requires a larger program size and, thus, it is not adapted for execution on a PDA due to a limited computing power of a CPU and/or a limited memory capacity. Further, with respect to acquisition of Web data, supporting of the TCP/IP protocol on a PDA involves certain technical difficulties, which necessarily leads to prohibitive increase of costs. In general, under a mobile environment, connection to the Internet is not always expected. While it takes at least several minutes in time to access a Web server and to transfer data, such operation time just for waiting may not be disregarded by an internal battery of a PDA that has a relatively small size and a small capacity.

Thus, it is already known to pre-edit PIM data for a PDA by using PIM software on a desktop or a notebook PC acting as a host PC, to cut a desired portion only out of the saved PIM data, and then to download it to the PDA. Also, it is already known to download an HTML (HyperText Markup Language) file from a desired Web page to a host PC connected to the Internet in advance and then, responsive to a request from a PDA, to download the saved HTML file (e.g., a text portion only of the HTML file) to the PDA.

The aforementioned VW200 is designed to have the first housing portion, which conforms to the form factor of Type-II defined by PCMCIA/JEIDA, so that when it is inserted into a card slot provided in a host PC, it is enabled to exchange data with the host PC. Namely, while VW200 is inserted into the card slot, the host PC is arranged to download the data acquired in advance (e.g., PIM data or an HTML file) to the PDA. When the PDA is subsequently detached from the card slot, it exercises self-operating functions by virtue of an internal CPU and an internal battery, whereby it is capable of presenting the download data for browsing. Japanese Patent Application, which is assigned to the same applicant and which is identified in Japanese Application No. 8-12790 (IBM Docket Number JA996004—U.S. Application #778,317), discloses to transfer PIM data to a PDA of the PC card type while it is being inserted into a PC card slot. Further, another Japanese article by Hatori et al., "ChipScape for VW200" (Soft Bank), discloses to transfer Web data to a PDA of the PC card type while it is being inserted into a PC card slot.

In case of using a PDA of the PC card type such as VW200, a host PC merely requires a card slot for accepting such a PDA (currently, almost all notebook PCs have a card slot as a standard feature) and to install a program for transferring data to a PDA. Namely, in case of implementing the two examples as mentioned in the preceding paragraph, burdens of hardware/software imposed on a host PC would be expected to be minimum. However, because a PDA that is to receive download data has to conform with the form factor defined by PCMCIA/JEIDA, its range of application is substantially limited.

On the other hand, since various computer systems including PCs are provided with serial communication ports or the like as standard features adapted for data communications by wire, it is not technically difficult to download data by wire. However, it is not advantageous to implement downloading from a host PC to a PDA by wire or cable connection. This is because a downloadable place is constrained by a connection cable and yet it takes some time to attach the cable. Further, in a case where a host PC acting as an originator of data (reservoir of download data) is shared by plurality of PDAs, it follows that a cable is frequently connected to and disconnected from each PDA and, hence, its connector portion may be subject to mechanical damages quite often (in particular, for the laymen who is not accustomed to connecting/disconnecting a cable, damage to the connector would not be an uncommon occurrence but would be detrimental). Further, each PDA acting as a recipient or a destination must conform to the standardized requirements of a cable connector provided at a host PC. Moreover, each user has to carry a cable and this may degrade mobility of his/her PDA.

Recently, infrared communications have been widely used for data communications between devices. While infrared communications were originally used for remote control of household electric appliances such as TV sets or air conditioners, they are now frequently adopted for data exchange between computers. Briefly, a sending or transmitting side modulates digital signals and controls light emitting diodes to radiate infrared pulses for transmitting data on air, whereas a receiving side receives and amplifies the data for demodulating the digital signals. Such a basic principle applies to the remote controls and the computer communications as well.

In order to standardize infrared communication schemes (i.e., to strengthen interoperability of devices available from different makers), IrDA (Infra-red Data Association) was established in 1993. In accordance with the recommended standard of IrDA, a UART (Universal Asynchronous Receiver-Transmitter) is used to accomplish a low cost, infrared communication with a communication protocol of the SDLC (Synchronous Data Link Control) type. In short, this standard defined a low output, directional type (center angle: 15 degrees), one-to-one or one-to-N communication scheme. Basically, an infrared communication is adapted for use in a small sized, light weight and low cost apparatus such as a mobile type information processing device, which is intentionally designed for reduced weight and cost. For example, in a series of notebook PCs called "ThinkPad" (trademark of IBM Corp.) commercially available from IBM Japan, Ltd., an infrared communication function is provided as a standard feature.

In accordance with the IrDA defined protocol "IrLAP" for a data link, an infrared data communication comprises a sequence of phases, including "discovery", "connection", "information exchange" and "disconnection". In the "discovery" phase, a primary station (parent station: a host PC for example) transmits an infrared frame called XID (eXchange ID) command, whereas a secondary station (child station: a PDA for example) transmits an XID response (it is assumed here that the XID command/response routine refers to "Discovery Procedure" in its entirety as described in Section 6.8 of "Serial Intrared Link Access Protocol (IrLAP) Ver 1.0"). For setup of a connection, the primary station transmits an SNRM (Set Normal Response Mode) frame, whereas the secondary station returns either a UA (Unnumbered Acknowledgement) frame or a DM (Disconnected Mode) frame depending on whether or not the content of the SNRM frame is acceptable to the secondary. When the primary station receives the UA frame and the connection is set up, it is then possible to exchange information, and the primary station transfers data in the form of a frame called "I frame". Upon completion of the data transfer, the primary station transmits a DISC (Disconnection) frame to request disconnection and, upon receipt of the UA frame from the secondary station, the primary station completes the disconnecting procedure. After the connection is disconnected, each of the primary and secondary stations normally initializes its communication state respectively.

Now, regarding the aforesaid data transfer between a host PC and a PDA, i.e., downloading of data to the PDA, it has been already attempted to use an infrared communication for this sort of data transfer. For example, a Japanese Patent Publication, which is identified as JA PUPA 8-79330, discloses data transfers between information processing devices by an infrared communication.

More particularly, the disclosed PDA having an infrared communication function establishes an infrared connection with a connecting device for connecting to a network on its own initiative, thereby to acquire a file from a server machine on the network. However, as a prerequisite requirement, the disclosed PDA must be provided with its own modem protocol (e.g., Microcom Networking Protocol or the like). Provision of such a protocol means that the requirements for hardware/software of this device are complicated, which leads to a substantial increase of costs involved. Further, since the disclosed PDA is arranged to access a server on the network on its own initiative, the PDA must keep its operating state during accessing and during the entire period of data transfers involved, which causes the battery to be consumed rapidly.

Incidentally, in "Color Zaurus" of Sharp Corp. or "Windows CE" developed by Microsoft Corp. for PDAs, techniques have already been implemented for causing a PDA to acquire a Web page. Namely, a PDA is rendered to directly acquire Web data without any involvement of an external host computer system. However, they are designed such that a PDA is connected to a network (e.g., the Internet) for acquiring data on its own initiative and, thus, a PDA is subject to very large burdens imposed thereon in terms of access time, control of the TCP/IP protocol or the like.

PROBLEMS TO BE SOLVED BY THE INVENTION

It is, therefore, an object of this invention to provide an improved information processing apparatus that has an infrared communication function for communicating with an external device such as a PDA (Personal Digital Assistant), as well as a method of controlling the same.

It is another object of this invention to provide an improved information processing apparatus that is capable of smoothly transferring data, such as processed results obtained from execution of an application program, an HTML file acquired from a Web server in accordance with the TCP/IP (Transmission Control Protocol/Internet Protocol) protocol or the like, to an external device (PDA) by using an infrared communication function, as well as a method of controlling the same.

It is yet another object of this invention to provide an improved information processing apparatus that is capable of transferring data, such as processed results obtained from execution of an application program, an HTML file acquired from a Web server in accordance with the TCP/IP (Transmission Control Protocol/Internet Protocol) protocol or the like, to an external device (PDA) by using an infrared communication function without imposing burdens on the external device, as well as a method of controlling the same.

SUMMARY OF THE INVENTION

This invention has been made in consideration of said problems. According to a first aspect of the invention, an information processing apparatus having an infrared communication function comprises: an infrared transceiver for transmitting/receiving an infrared code; a memory for storing downloaded data; input means for allowing a user to input user commands; and means, responsive to a data download command from the user, for entering and staying in a station search state to transmit an infrared code to search for a destination station to which data is to be downloaded.

According to a second aspect of this invention, an information processing apparatus having an infrared communication function comprises: an infrared transceiver for transmitting/receiving an infrared code; a memory for storing downloaded data; input means for allowing a user to input user commands; means, responsive to a data download command from the user, for entering and staying in a station search state to transmit an infrared code to search for a destination station to which data is to be downloaded; means, responsive to receipt of an infrared code that indicates a response of station discovery from the destination station, for executing an infrared communication to transmit the download data; and means, responsive to termination of the infrared communication with the destination station, for returning to the station search state.

The information processing apparatus relating to either of the first or second aspect may include means, responsive to a direction from the user, for exiting the station search state.

According to a third aspect of this invention, an information processing apparatus having an infrared communication function comprises: an infrared transceiver for transmitting/receiving an infrared code; connection means for connecting to a network; file acquisition means, being operative without the involvement of the infrared transceiver, for acquiring a file from a predetermined server through the network; a memory for storing the acquired file as download data; input means for allowing a user to input user commands; and means, responsive to a data download command from the user, for entering and staying in a station search state to transmit an infrared code to search for a destination station to which data is to be downloaded.

According to a fourth aspect of this invention, an information processing apparatus having an infrared communication function comprises: an infrared transceiver for transmitting/receiving an infrared code; connection means for connecting to a network; file acquisition means, being operative without the involvement of the infrared transceiver, for acquiring a file from a predetermined server through the network; a memory for storing the acquired file as download data; input means for allowing a user to input user commands; means, responsive to a data download command from the user, for entering and staying in a station search state to transmit an infrared code to search for a destination station to which data is to be downloaded; means, responsive to receipt of an infrared code that indicates a response of station discovery from the destination station, for executing an infrared communication to transmit the download data; and means, responsive to termination of the infrared communication with the destination station, for returning to the station search state.

The information processing apparatus relating to either of the third or fourth aspects may include means, responsive to a direction from the user, for exiting the station search state.

According to a fifth aspect of this invention, an information processing apparatus having an infrared communication function of the type which transmits by itself an exchange ID (XID) command to search for a destination station, establishes a connection with the destination station in response to receipt of an XID response from the destination station indicating station discovery, and disconnects the connection in response to transmission of a disconnection (DISC) frame by itself and receipt of an unnumbered acknowledgement (UA) frame from the destination station, comprises: means for attempting to disconnect the connection by transmitting a DISC frame; and means, responsive to disconnection of the connection, for returning to a station search state to transmit an XID command.

According to a sixth aspect of this invention, a method of controlling an information processing apparatus having an infrared transceiver for transmitting/receiving an infrared code, a memory for storing download data, and input means for allowing a user to input user commands, comprises the steps of: responsive to a data download command from the user, entering and staying in a station search state to transmit an infrared code to search for a destination station to which data is to be downloaded; responsive to receipt of an infrared code that indicates a response of station discovery from the destination station, executing an infrared communication to transmit the download data; and responsive to termination of the infrared communication with the destination station, returning to the station search state.

According to a seventh aspect of this invention, a method of controlling an information processing apparatus having an infrared transceiver for transmitting/receiving an infrared code, a memory for storing download data, and input means for allowing a user to input user commands, comprises the steps of: responsive to a data download command from the user, entering and staying in a station search state to transmit an infrared code to search for a destination station to which data is to be downloaded; responsive to receipt of an infrared code that indicates a response of station discovery from the destination station, executing an infrared communication to transmit the download data; responsive to termination of the infrared communication with the destination station, returning to the station search state; and responsive to a direction from the suer, exiting the station search state.

According to an eighth aspect of this invention, a method of controlling an information processing apparatus having an infrared transceiver for transmitting/receiving an infrared code, a memory for storing download data, input means for allowing a user to input user commands, and connection means for connecting to a network, comprises the steps of:

(a) responsive to a data download command from the user, entering and staying in a station search state to transmit an infrared code to search for a destination station to which data is to be downloaded; (b) responsive to receipt of an infrared code that indicates a response of station discovery from the destination station, executing an infrared communication to transmit the download data; (c) responsive to termination of the infrared communication with the destination station, returning to the station search state; (d) without the involvement of execution of any of the steps (a) through (c), acquiring a file from a predetermined server through the network; and (e) storing the acquired data as the download data.

According to a ninth aspect of this invention, a method of controlling an information processing apparatus having an infrared transceiver for transmitting/receiving an infrared code, a memory for storing download data, input means for allowing a user to input user commands, and connection means for connecting to a network, comprises the steps of: (a) responsive to a data download command from the user, entering and staying in a station search state to transmit an infrared code to search for a destination station to which data is to be downloaded; (b) responsive to receipt of an infrared code that indicates a response of station discovery from the destination station, executing an infrared communication to transmit the download data; (c) responsive to termination of the infrared communication with the destination station, returning to the station search state; (d) without the involvement of execution of any of the steps (a) through (c), acquiring a file from a predetermined server through the network; (e) storing the acquired data as the download data; and (f) responsive to a command from the user, exiting the station search state.

According to a tenth aspect of this invention, a method of controlling an information processing apparatus having an infrared communication function of the type which transmits by itself an exchange ID (XID) command to search for a destination station, establishes a connection with the destination station in response to receipt of an XID response from the destination station indicating station discovery, and disconnects the connection in response to transmission of a disconnection (DISC) frame by itself and receipt of an unnumbered acknowledgement (UA) frame from the destination station, comprises the steps of: attempting to disconnect the connection by transmitting a DISC frame; and responsive to disconnection of the connection, returning to a station search state to transmit an XID command.

According to an eleventh aspect of this invention, a computer readable storage medium for storing in a tangible form a computer program executable on a computer system comprising an infrared transceiver for transmitting/receiving an infrared code, a memory for storing download data, and input means for allowing a user to input user commands, said computer program comprising: a routine, responsive to a data download command from the user, for entering and staying in a station search state to transmit an infrared code to search for a destination station to which data is to be downloaded; a routine, responsive to receipt of an infrared code that indicates a response of station discovery from the destination station, for executing an infrared communication to transmit the download data; and a routine, responsive to termination of the infrared communication with the destination station, for returning to the station search state.

According to a twelfth aspect of this invention, a computer readable storage medium for storing in a tangible form a computer program executable on a computer system comprising an infrared transceiver for transmitting/receiving an infrared code, a memory for storing download data, and input means for allowing a user to input user commands, said computer program comprising: a routine, responsive to a data download command from the user, for entering and staying in a station search state to transmit an infrared code to search for a destination station to which data is to be downloaded; a routine, responsive to receipt of an infrared code that indicates a response of station discovery from the destination station, for executing an infrared communication to transmit the download data; a routine, responsive to termination of the infrared communication with the destination station, for returning to the station search state; and a routine, responsive to a command from the user, for exiting the station search state.

According to a thirteenth aspect of this invention, a computer readable storage medium for storing in a tangible form a computer program executable on a computer system comprising an infrared transceiver for transmitting/receiving an infrared code, a memory for storing download data, input means for allowing a user to input user commands, and connection means for connecting to a network, said computer program comprising: (a) a routine, responsive to a data download command from the user, for entering and staying in a station search state to transmit an infrared code to search for a destination station to which data is to be downloaded; (b) a routine, responsive to receipt of an infrared code that indicates a response of station discovery from the destination station, for executing an infrared communication to transmit the download data; (c) a routine, responsive to termination of the infrared communication with the destination station, for returning to the station search state; (d) a routine, being operative without the involvement of execution of any of the routines (a) through (c), for acquiring a file from a predetermined server through the network; and (e) a routine for storing the acquired data as the download data.

According to a fourteenth aspect of this invention, a computer readable storage medium for storing in a tangible form a computer program executable on a computer system comprising an infrared transceiver for transmitting/receiving an infrared code, a memory for storing download data, input means for allowing a user to input user commands, and connection means for connecting to a network, said computer program comprising: (a) a routine, responsive to a data download command from the user, for entering and staying in a station search state to transmit an infrared code to search for a destination station to which data is to be downloaded; (b) a routine, responsive to receipt of an infrared code that indicates a response of station discovery from the destination station, for executing an infrared communication to transmit the download data; (c) a routine, responsive to termination of the infrared communication with the destination station, for returning to the station search state; (d) a routine, being operative without the involvement of execution of any of the routines (a) through (c), for acquiring a file from a predetermined server through the network; and (e) a routine for storing the acquired data as the download data; and (f) a routine, responsive to a direction from the user, for exiting the station search state.

According to a fifteenth aspect of this invention, a computer readable storage medium for storing in a tangible form a computer program executable on a computer system having an infrared communication function of the type which transmits by itself an exchange ID (XID) command to search for a destination station, establishes a connection with the destination station in response to receipt of an XID response from the destination station indicating station discovery, and disconnects the connection in response to transmission of a disconnection (DISC) frame by itself and receipt of an unnumbered acknowledgement (UA) frame from the destination station, said computer program comprising: a routine for attempting to disconnect the connection by transmitting a DISC frame; and a routine, responsive to disconnection of the connection, for returning to a station search state to transmit an XID command.

In case of considering this invention, it should be fully understood that (1) an infrared communication involves a parent-child relationship between an apparatus (a parent (or primary) station) that performs a station search (i.e., transmits an XID command) and a device (a child (or secondary) station) that is responsive to the station search (i.e., returns an XID response), and (2) an information processing apparatus (e.g., a PC) that acquires download data in advance functions as a parent (a master), whereas an external device (e.g., a PDA) that is to receive the download data as its destination station functions as a child (a slave).

The information processing apparatus relating to the first through fifth aspects of this invention, or the information processing apparatus implementing the methods relating to the sixth through tenth aspects of this invention is arranged to download data to a lower-level, external device (e.g., a PDA) by an infrared communication. After a data transmission by the infrared communication is terminated, the apparatus automatically returns to a station search state again. For this reason, even after data downloading to the external device has been terminated, by simply holding the external device that is set into an infrared communication mode to a station discoverable region (i.e., within the visual field angles of an infrared transmitter) of the information processing apparatus, a connection between them is established, thereby enabling to smoothly develop data download operations to the external device.

Further, the information processing apparatus relating to the third and fourth aspects of this invention, or the information processing apparatus implementing the methods relating to the eighth and ninth aspects of this invention is arranged to periodically access a predetermined server machine (e.g., a Web server) to acquire a desired file (e.g., an HTML file). This file acquisition operation is carried out without the involvement of operations of an infrared transceiver (i.e., an infrared connection phase with a PDA as an external device). In other words, the information processing apparatus attempts to continually perform caching of the most recent download data for the PDA. As a result, when the PDA as an external device is set into an infrared communication mode and a user simply holds the PDA to a station discoverable region (i.e., within the visual field angles of an infrared transmitter) of the information processing apparatus, a connection between them is established, thereby enabling the PDA to receive the most recent data.

Typically, it takes at least several minutes in time to access a Web server on the Internet to transfer one or more Web pages, and to store the acquired file (e.g., an HTML file) into its own memory. No matter how a line speed on a network is improved in the near future, there would be no hope to shorten the time required for acquisition of a Web page less than 1 second, due to negative factors such as control of a protocol, a disk access of a Web server, and accessing time at a gateway. Thus, if a PDA is of the type that is connected to a network on its own initiative to directly acquire a Web page, it will be inevitably subject to consumption of its own internal battery during such data acquisition. Further, in order to perform works such as control of the TCP/IP protocol, any device requires to have its own intelligence (i.e., a specification of hardware/software). Where a PDA itself supports works such as control of the TCP/IP protocol, it is difficult to maintain small size/light weight/immediateness, which leads to increase of costs of the device.

However, in accordance with the third, fourth, eighth and ninth aspects of this invention, the information processing apparatus attempts to continually acquire the most recent Web page in lieu of a PDA. Namely, the information processing apparatus continually performs caching of download data for the PDA. A personal computer, which is larger in size and has a greater power capacity than a PDA, may be used as the information processing apparatus. Thus, there is no need for a PDA, as an external device to receive a Web page, to support protocol control such as accessing to a Web server on its own initiative, thereby enabling to maintain its small size/light weight/immediateness. Further, while a PDA is capable of eventually acquiring a Web page, it does not access a Web server on its own initiative and, thus, it can acquire such data in a shorter period of time without consuming its internal battery having a relatively small capacity.

A general purpose personal computer, such as a desktop type or a notebook type, may function as the information processing apparatus of this invention. In general, such a PC may be provided with much more intelligence (e.g., a network protocol, a PIM application or the like) than a small sized PDA. By connecting an intelligent PC to a network and by causing the PC to act as a primary station of an infrared communication, this invention enables to simplify a system configuration and to reduce a size of a PDA acting as a secondary station of the infrared communication. Further, since the PDA itself does not perform a communication by a modem, consumption of its own power can be substantially reduced. In accordance with this invention, there is no conflict with the essential requirements of a PDA, including small size/light weight/immediateness.

Further, an infrared communication between the information processing apparatus and a PDA may be made completely independent of a protocol in a network and, accordingly, even if a communication scheme in the network is changed or improved in the near future, there will be no obstacle to data downloading to the PDA. In other words, there is no need for the PDA to be aware of an event in the network at all.

To summarize the above, in accordance the information processing apparatus of this invention, it is possible to smoothly download data such as PIM data or a Web page to a PDA as its destination without imposing burdens on the PDA.

Further, the computer readable storage medium relating to the eleventh through fifteenth aspects of this invention define a structural or functional cooperative interrelationship between a computer program and the storage medium for implementing functions of the computer program. In other words, by mounting the storage medium onto the computer system (or installing the computer program into the computer system), it becomes possible to obtain advantages similar to those of the first through tenth aspects of this invention.

Incidentally, a Basic Rate ISDN has a data transfer rate of 64 kbps, whereas an infrared communication normally has a data transfer rate in the range of several Mbps. It should be fully understood that in accordance with the data download operation using the infrared communication of this invention, such data can be acquired much faster than a PDA of the type that connect itself to an ISDN on its own initiative.

The foregoing and other objects, features and advantages of this invention will be apparent from the following detailed description of a preferred embodiment, as illustrated in the accompanying drawings.

DESCRIPTION OF A PREFERRED EMBODIMENT OF THE INVENTION

Now, with reference to the drawings, a preferred embodiment of this invention will be described in detail.

A. Hardware Configuration of Personal Computer (PC)

Figure 1:
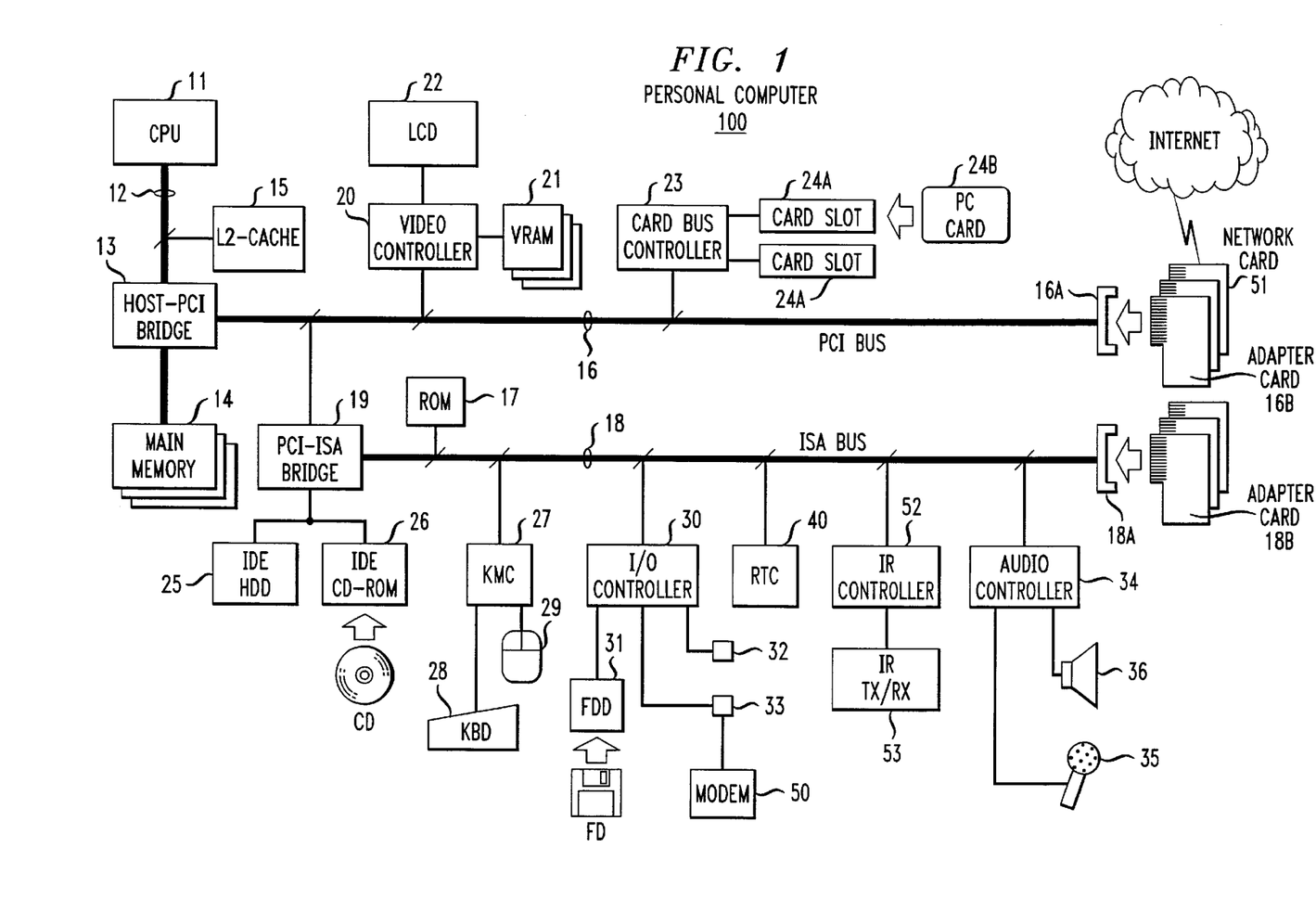
FIG. 1 is a schematic diagram showing a hardware configuration of a typical personal computer (PC) 100 embodying this invention.

FIG. 1 schematically shows a hardware configuration of a typical personal computer (PC) 100 which embodies this invention. An example for implementing this invention is a type of PC which is pursuant to the specification of OADG (PC Open Architecture Developer's Group). Preferably, PC 100 incorporates an operating system such as "Windows95" of Microsoft Corp. or "OS/2" of IBM Corp., which provides a multitasking environment. Hereinafter, each component will be described.

CPU 11 acting as a main controller executes a variety of programs under the control of an operating system (OS). CPU 11 may be a CPU chip called "Pentium" made by Intel Corp.

CPU 11 interconnects with each hardware block (to be described) through a hierarchical bus structure of three levels, which comprises a processor bus 12 directly coupled to its own external pins, a PCI (Peripheral Component Interconnect) bus 16 as a local bus and an ISA (Industry Standard Architecture) bus 18.

The processor bus 12 and PCI bus 16 are interconnected by a bridge circuit (host-PCI bridge) 13. The bridge circuit 13 of the present embodiment comprises a memory controller for controlling access operations to an main memory 14, a data buffer for absorbing a speed difference between the buses 12 and 16, or the like.

The main memory 14 is a writable memory used as a read-in areas or working areas of executed programs. In general, the main memory 14 comprises a plurality of DRAM (dynamic RAM) chips such that its basic capacity is typically 16 MB and extendable up to 128 MB. The executed programs include a variety of software programs such as an OS or "Windows95" and "Auto Pull Station" (tentatively named) application used for practicing this invention.

L2-cache 15 is a high speed memory for absorbing access time to the main memory 14 and is used for temporarily storing limited code and data to be frequently accessed by CPU 11. In general, L2-cache 15 comprises SRAM (static RAM) chips and its typical capacity is 256 KB.

PCI bus 16 is a type of bus that enables to transfer data at a relatively high rate (bus width: 32/64 bits, maximum operating frequency: 33/66 MHz, maximum data transfer rate: 132/264 MBps), and is used for connecting relatively fast peripheral devices such as a video controller 20 and a card bus controller 23. As well known in the art, the PCI architecture is based on the proposal of Intel Corp. and implements the PnP (Plug and Play) function.

The video controller 20 is a dedicated controller for actually processing drawing instructions from CPU 11. In operation, it temporarily stores the processed drawing information into a screen buffer (VRAM) 21, reads the drawing information from the VRAM 21 and provides the same as a video output to a liquid crystal display (LCD) 22 or a CRT display. The video controller 20 supports the VGA (Video Graphic Array) function or the SVGA (Super Video Graphic Array) function.

The card bus controller 23 is a dedicated controller for directly coupling those bus signals on PCI bus 16 to a PC card slot 24A. Insertable into the PC card slot 24A is a PC card 24B, which is pursuant to the industry standard (e.g., "PC Card Specification 95") defined by PCMCIA (Personal Computer Memory Card International Association)/JEIDA (Japan Electronic Industry Development Association). Among a type of the PC card 24B, there is a modem card and a device for implementing connection to a network such as a LAN card. By inserting a PC card of this type, it becomes possible to connect PC 100 to a wide area network such as the Internet.

PCI bus 16 and ISA bus 18 are interconnected by a bridge circuit (PCI-ISA bridge) 19. The bridge circuit 19 of the present embodiment is constructed to contain a DMA controller, a programmable interrupt controller (PIC) and a programmable interval timer (PIT).

Further, the bridge circuit 19 of the present embodiment is provided with an IDE connector, which is pursuant to the IDE (Integrated Drive Electronics), for connecting external storage devices. To this IDE connector, an IDE hard disk drive (HDD) 25 and an IDE CD-ROM drive 26 can be connected. Relatedly, accessing to a file on a hard disk or a CD-ROM is executed by an OS subsystem called "Filer Manager". HDD 25 is better than another external storage device in terms of access rate. Accordingly, by copying software programs (OS, device drivers, applications or the like) onto disks of HDD 25 (i.e., "installing" them into the system), these programs are ready for use by the system. Further, CD-ROM drive 26 is primarily used for installing software programs stored in a CD-ROM into the system.

ISA bus 18 has a slower data transfer rate than PCI bus 16 (bus width: 16 bits, maximum data transfer rate: 4 Mbps) and, thus, it is used for connecting relatively slower peripheral devices such as a ROM 17, a keyboard/mouse controller (KMC) 27, an I/O controller 30, an audio controller 34, a real time clock (RTC) 40 or the like.

ROM 17 is a non-volatile memory, which permanently stores code groups (BIOS: Basic Input/Output System) for controlling respective hardware components such as the video controller 20, a keyboard 28, a floppy disk drive (FDD) 31 or the like, in addition to a POST (Power On Self-Test) program or the like.

The keyboard/mouse controller (KMC) 27 is a dedicated controller for capturing input scan codes from the keyboard 28 or input coordinate values from a mouse 29 as computer data.

I/O controller 30 is a peripheral controller for controlling drive operations of the floppy disk drive (FDD) 31, as well as data I/O operations of an external device connected via a parallel port 32 or a serial port 33. To the parallel port 32, a printer (not shown) or the like is connected. To the serial port 33, a modem 50 is connected. The modem is a device for transmitting computer data in a digital form via an analog telephone line and, more particularly, it is constructed to modulate transmission data and to demodulate received data. With provision of the modem 50, it becomes possible to connect PC 100 to a wide area network such as the Internet.

Similarly to HDD 25 and CD-ROM 26, FDD 31 is one of the external storage devices. FDD 31 is primarily used for installing software programs provided in the form of a CD-ROM into the system, or for storing working data/files onto a FD.

The audio controller 34 is a dedicated controller for performing I/O processing of audio signals and, more particularly, it is constructed to capture audio signals from a microphone 35 into the system, or to convert audio data into an analog form for outputting from a speaker 36.

The real time clock (RTC) 40 is a device for measuring the current time-of-day. In general, RTC 40 is mounted on a single chip with a CMOS memory (not shown). Typically, this CMOS memory is used for temporarily storing critical information to the system 100 such as system configuration information and a power on password. RTC/CMOS 40 is backed up by a back up battery (normally a coin batter: not shown) so that the measured/stored contents are not lost even after PC 100 goes to its power-off state.

IR controller 52 is a dedicated controller for implementing exchange of infrared codes with an external device (PDA 200 in the present embodiment: to be described) in accordance with the aforementioned IrDA. IR transceiver 53 is a module for actually performing transmission/reception of infrared data.

At one end of each bus 16/18, at least one bus slot 16A/18A is provided respectively. To the bus slots 16A and 18A, a PCI compatible adapter card 16B and an ISA compatible adapter card 18B may be mounted respectively. On each adapter card 16B/18B, hardware may be manipulated by using device drivers dedicated to each card. One example of the adapter cards is a network card for implementing connection to LAN (Ethernet or Token Ring). Inserting such a card into a bus slot, it is possible to connect the personal system 100 to a world area network such as the Internet.

A typical user of the personal computer 100 operates the system through keyboard 28 or mouse 29 to execute various application programs such as a word processing program, a spreadsheet program, a communication program or the like so that the executed result is useful for accomplishing his/her work on the display screen (i.e., desktop). A user may install a desired application into the system by copying the same from CD-ROM drive 26 or FDD 31 onto HDD 25. Alternatively, a desired application may be installed into the system by downloading the same from a Web server to HDD 25. It is noted that this invention may be implemented in the form of an application program so installed.

Personal computers commercially available in the current marketplace will sufficiently function as the computer system 100 shown in FIG. 1. While additional electronic circuits or the like other than those shown in FIG. 1 are required to construct the computer system 100. However, these components are not described in the present specification, since they are well known in the art and yet they do not pertain to the gist of this invention. Further, it should be understood that for brevity of the drawings, only a portion of the connections between the illustrated hardware blocks is shown.

B. Hardware Configuration of Information Processing Terminal (PDA)

Figure 2:
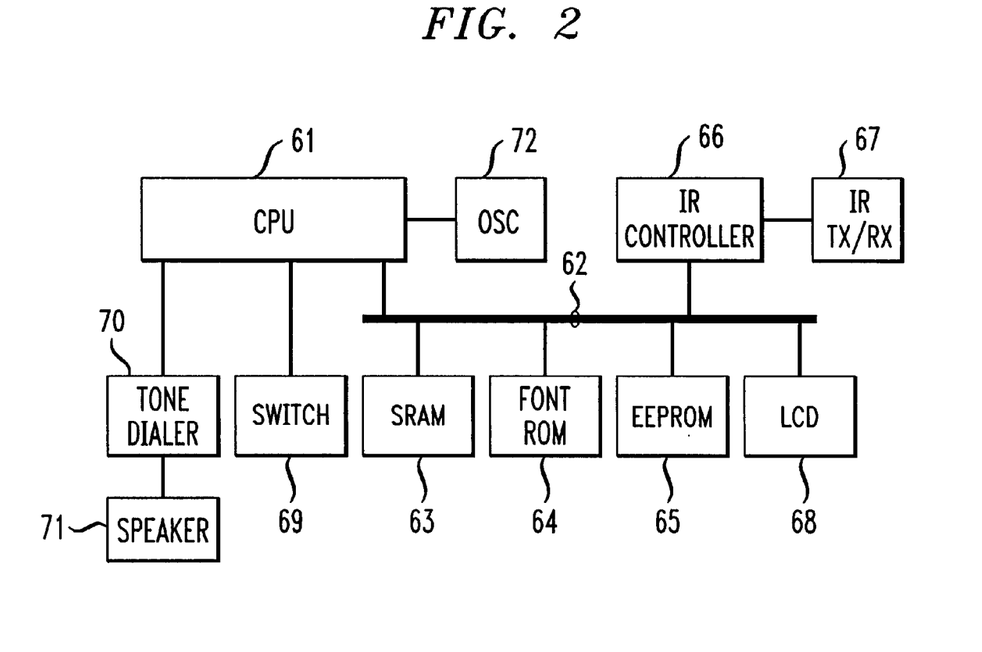
FIG. 2 is a schematic diagram showing a hardware configuration of PDA 200 to which data is to be downloaded as a destination station in a preferred embodiment of this invention.

FIG. 2 schematically shows a hardware configuration of PDA 200, which is to receive download data as its destination in the present embodiment.

CPU 61 acting as a main controller operates under the control of operating clocks supplied from a clock oscillator (OSC) 72. CPU 61 may be a 16 bit micro processor called "TLCS-9001" made by Toshiba Corp. External pins of CPU 61 are coupled to an internal bus 62 so that it is interconnected to respective components via the internal bus 62.

SRAM 63 is a writable memory that does not require a refresh operation and it is primary used as a working area of CPU 61. Font ROM 64 is a read only memory for storing each character image (i.e., font) displayable on a liquid crystal display (LCD) panel 11. EEPROM 65 is a read only memory that is erasable under certain conditions and it is primarily used for permanently storing control codes for operating respective hardware component and security data such as a serial number.

IR controller 66 is a dedicated controller for processing an infrared code transmitted/received by IR transceiver 67 and for capturing the same as computer data.

Reference number 68 indicates the liquid crystal display panel 11. CPU 61 of the present embodiment drives the display 68 by using a font image in the Font ROM 64.

A switch 69 is one of the input devices provided on a housing surface of PDA 200. PDA 200 is designed such that it enters into an infrared reception (i.e., data download) mode by applying a predetermined action (e.g., depression) to the switch 69.

Further, CPU 61 causes a tone dialer 70 to generate sounds of predetermined frequencies from a speaker 71.

While additional electronic circuits or the like other than those shown in FIG. 2 are required to construct PDA 200. However, these components are not described in the present specification, since they are well known in the art and yet they do not pertain to the gist of this invention. Further, it should be understood that for brevity of the drawings, only a portion of the connections between the illustrated hardware blocks is shown.

Figure 3:
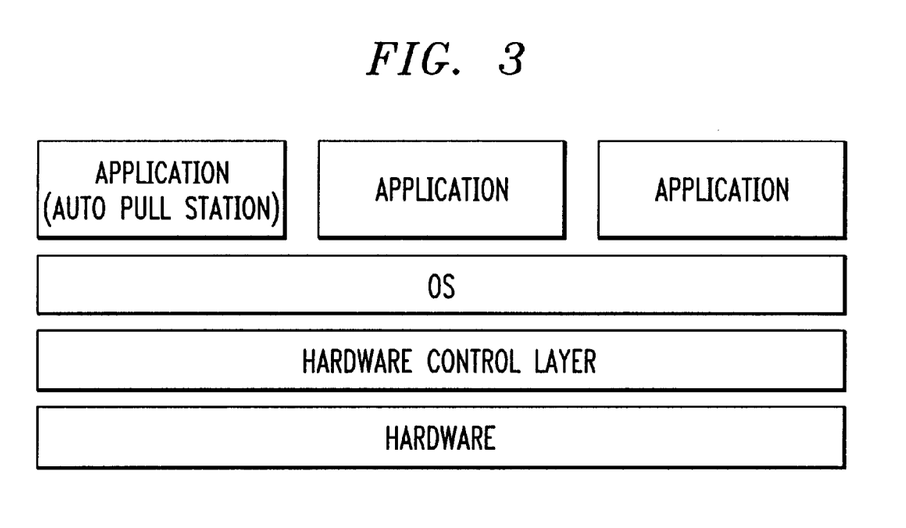
FIG. 3 is a schematic diagram showing a hierarchical configuration of software programs on PC 100.

C. Software Configuration of Personal Computer FIG. 3 schematically shows a hierarchical configuration of software programs that are executable on the personal computer 100.

Hardware Control Layer

The hardware control layer located at the lowest level is a software layer for causing any physical difference of respective hardware (due to different makers or versions) to be invisible to software at a higher level (such as an operating system, applications or the like). For example, a module containing the hardware control layer converts a command of generic form issued by software at a higher level into an inherent form adapted for driving hardware. The hardware control layer may be provided on a motherboard as a standard feature in the form of BIOS (Basic Input/Output System) stored in ROM 17. Alternatively, the hardware control layer may be installed into the system in the form of device drivers (e.g., a mouse driver, a printer driver, a CD-ROM driver or the like).

Operating System (OS)

Operating system (OS) is basic software for controlling hardware/software of the system as a whole, which includes said "OS/2", "Windows95", "UNIX" or the like. In order to implement this invention in a preferred manner, the operating system is preferably provided with a multitasking function. In general, the operating system comprises a kernel region and a user region.

The kernal region contains a collection of respective basic functions for monitoring overall operations of PC 100 to support execution of various programs such as applications. In a core portion of the kernal region, there is contained "File Manager" for managing recordation of a file onto an auxiliary storage device such as HDD 25, "Scheduler" for managing an order of task execution and priorities, "Memory Manager" for assigning memory areas, "Resource Manager" for managing system resources such as I/O addresses and DMA levels, or the like.

On the other hand, the user region comprises functional routine portions for supporting applications selected by a user and, more particularly, it contains "User Interface" and "Window System". "User Interface" (alternatively called 'shell') has functions for interpreting a command from the user, for conveying the same to the core portion of the kernal region and for conveying a response from the core portion to the user. "Window System" is a functional portion for executing window display on the display 22, which includes 'X Window" of UNIX, 'Presentation Manager' of OS/2 or the like. Further, within the user region, there is contained a library (called 'shared library' or 'dynamic link library (DLL)) that comprises a collection of functions or data to be shared by plural software programs. As a user interface widely used in these days, there is "GUI (Graphical User Interface)" that is designed to display in a bitmap form and to support click/drag-and-drop function of an icon by a mouse.

Application

Application programs on the top layer is ones used for a practical purpose which includes a word processing program, a database program, a spreadsheet program, a communication program or the like. Further, a utility program (also called "tool") for improving user-friendliness is a sort of applications. Further, "Auto Pull Station" (tentatively named: to be described) application for embodying this invention is an example of applications.

Normally, a user may obtain his/her required software program (OS, device drivers, applications or the like) in the form of a storage medium such as a FD, a CD-ROM or the like. By mounting such a storage medium into its associated drive unit and by copying a desired software program into a disk in HDD 25 (i.e., "installing" into the system), the system becomes ready for using the same (as described above). Further, as another approach that grains popularity recently, a desired application may be installed into the system by downloading the same from an external computer system (e.g., a Web server) connected to a network.

D. Data Transfer Operations by Infrared Communication

In the preceding sections, we have described hardware/ software configurations of the computer systems 100 and 200 implementing this invention. Now, in the present section, we will describe the processing procedures of "Auto Pull Station" (tentatively named) application that is operable in such a system environment.

"Auto Pull Station" application may be installed into the system by mounting a storage medium for storing this application program in a tangible form such as a CD or a FD into a storage device such as CD-ROM drive 26 or FDD 31 and by copying into a hard disk, for example. Alternatively, this application program may be installed into the system 100 or temporarily loaded into the memory 14 by downloading the same from another computer system (e.g., a Web server) through a network (e.g., the Internet). Incidentally, "Pull" within the name of "Auto Pull Station" is in accord with "pull" of the so-called "push and pull" (In the network arena, "push" generally means to cast out (i.e., to broadcast) data from a server to a client one-sidely, whereas "pull" generally means to read (i.e., to extract) data in response to designation of a file name by a client).

Figure 4:
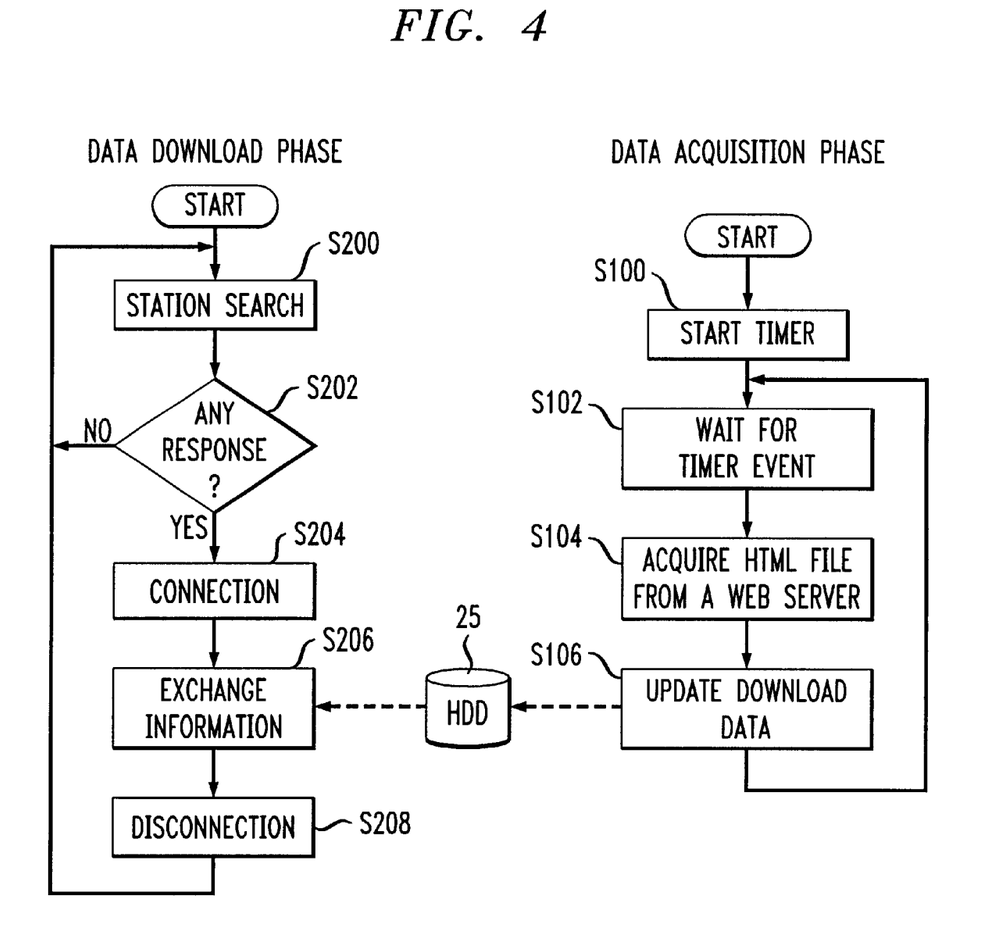
FIG. 4 is a flow chart showing procedures to be followed when PC 100 attempts to download data to PDA 200 by an infrared communication.

FIG. 4 shows a flow chart of the procedure processed by PC 100 when it attempts to download to PDA 200 by infrared communications (i.e., operations of "Auto Pull Station"). "Auto Pull Station" exists as an icon, which is presented by an operating system such as "Windows95", "OS/2" or the like on the desktop screen of PC 100. A user can start "Auto Pull Station" by double clicking this icon (i.e., a double-click operation of the mouse 29).

"Auto Pull Station" comprises a download data acquisition phase (corresponding with steps S100 through S106 shown in FIG. 4) and a data download phase (corresponding with steps S200 through S208 shown in FIG. 4). These phases are executed in a substantially simulataneous or concurrent manner in a multitasking environment.

In the data acquisition phase, a timer having a predetermined timeout value (e.g., 10 minutes) is set at first (step S100). Whenever the timeout value expires, a timer event occurs (step S102).

In response to occurrence of this timer event, a preregistered HTML (HyperText Markup Language) file is acquired from a predetermined Web server on the Internet (step S104). Normally, connection to the Internet is done in accordance with the TCP/IP protocol (as well known in the art). Further, an HTML file may be normally designated by a URL (Uniform Resource Locator) character string. Moreover, accessing to a Web server is done in accordance with a protocol described by URL (e.g., "http (HyperTest Transfer Protocol)"), as well known in the art. Incidentally, acquisition of a selected HTML file only is done in accordance with a general observation that a user of a PDA (i.e., in a mobile environment) prefers to have selected information only (e.g., a Web page such as a newspaper article, stock quotations, a weather report, traffic information or the like).

A newly acquired HTML file replaces a file having the same name and being already stored in HDD 25, thereby to save it as download data. As a result, within the hard disk of PC 100, the most recent HTML file is always cached. The acquired HTML file may be converted into a form adapted for downloading, or into another form adapted for processing by a destination of download data. For example, an image portion of an HTML file may be removed to leave a text portion only, or an HTML file may be truncated into a predetermined file size based on a predetermined rule.

On the other hand, in the data download phase, PC 100 starts transmission of an "XID (exchange ID) command" frame form IR transceiver 53 to conduct "Station Search", namely, to search for PDA 200 as a destination of the download data (step S200). PC 100 continues the station search operation (step S202) unless there is an explicit indication of suspension of the IR communication.

When PDA 200 is in the IR communication mode and its IR transceiver 67 comes within the visual field angles of IR transceiver 53 of PC 100 (normally, this is done by a user who holds PDA 200 to PC 100), PDA 200 issues an "XID response" frame in response to the XID command (described above), thereby to effectuate the station search. Within each frame of the XID command and the XID response, respective device drivers are included, whereby each party can acknowledge the other party's address respectively. It is assumed herein that the aforementioned XID command/response routine refers to "Discovery Procedure" in its entirety as described in Section 6.8 of "Serial Infrared Link Access Protocol (IrLAP) Ver 1.0").

Next, setup of a connection between PC 100 and PDA 200 is carried out (step S204). This setup of connection means a negotiation procedure for determining a communication rate of frames, a data size or the like between PC 100 and PDA 200. For setup of connection, PC 100 transmits an SNRM (Set Normal Response Mode). In response, PDA 200 returns either a UV (Unnumbered Acknowledgement) frame or a DM (Disconnected Mode) frame depending on whether or not the description content of the SNRM frame is acceptable to it.

When PC 100 receives the UA frame and establishes the connection, it eventually enters into a state where information can be exchanged by an IR communication (step S206). PC 100 serially transmits download data stored in its own HDD 25 in the form of I (information) frames.

Download data to PDA 200 is an HTML file acquired in advance from a Web server. As described above, PC 100 periodically acquires a pre-registered HTML file from a predetermined Web server and stores the same into HDD 25 (steps S104, S106). Namely, PC 100 periodically updates download data to be used by PDA 200 and, thus, it may function as a cache of PDA. On the other hand, to PDA 200 entered into a receipt mode, download data is immediately transferred by simply placing it within the visual field angles of IR transceiver 53. PDA 200 does not require to support complex functions such as the TCP/IP protocol to acquire desired data such as a Web page or the like. Further, since PDA 200 is not connected to a network (e.g., the Internet) on its own initiative, it does not require to execute complex processing procedures associated with establishment of a connection and accessing to a server, nor is it subject to battery consumption associated with such accessing time. Moreover, since an IR communication has a data transfer rate in the range of several Mbps (Basic Rate ISDN: 64 kbps), it takes only several seconds at most to receive desired data (e.g., an HTML file).

Upon completion of a data transfer, disconnecting the connection is carried out (step S208). At this time, PC 100 transmits a DISC (Disconnection) frame, whereas PDA responds to this by returning a UA frame.

After the connection is disconnected, PC 100 initializes the communication state, and PDA 200 resets the communication mode. However, PC 100 returns to the station search mode (step S200) and, unless the transmission state is explicitly reset by the user, it continually issues an XID command to retry the station search. Thus, when a user simply holds PDA 200 (or another PDA) that is set into the communication mode to PC 100 again, data download operations similar to those described above will be developed. Even during the station search, download data (e.g., an HTML file) is sequentially updated and, thus, PDA 200 is able to acquire the most recent data smoothly and instantaneously.

Figure 5:
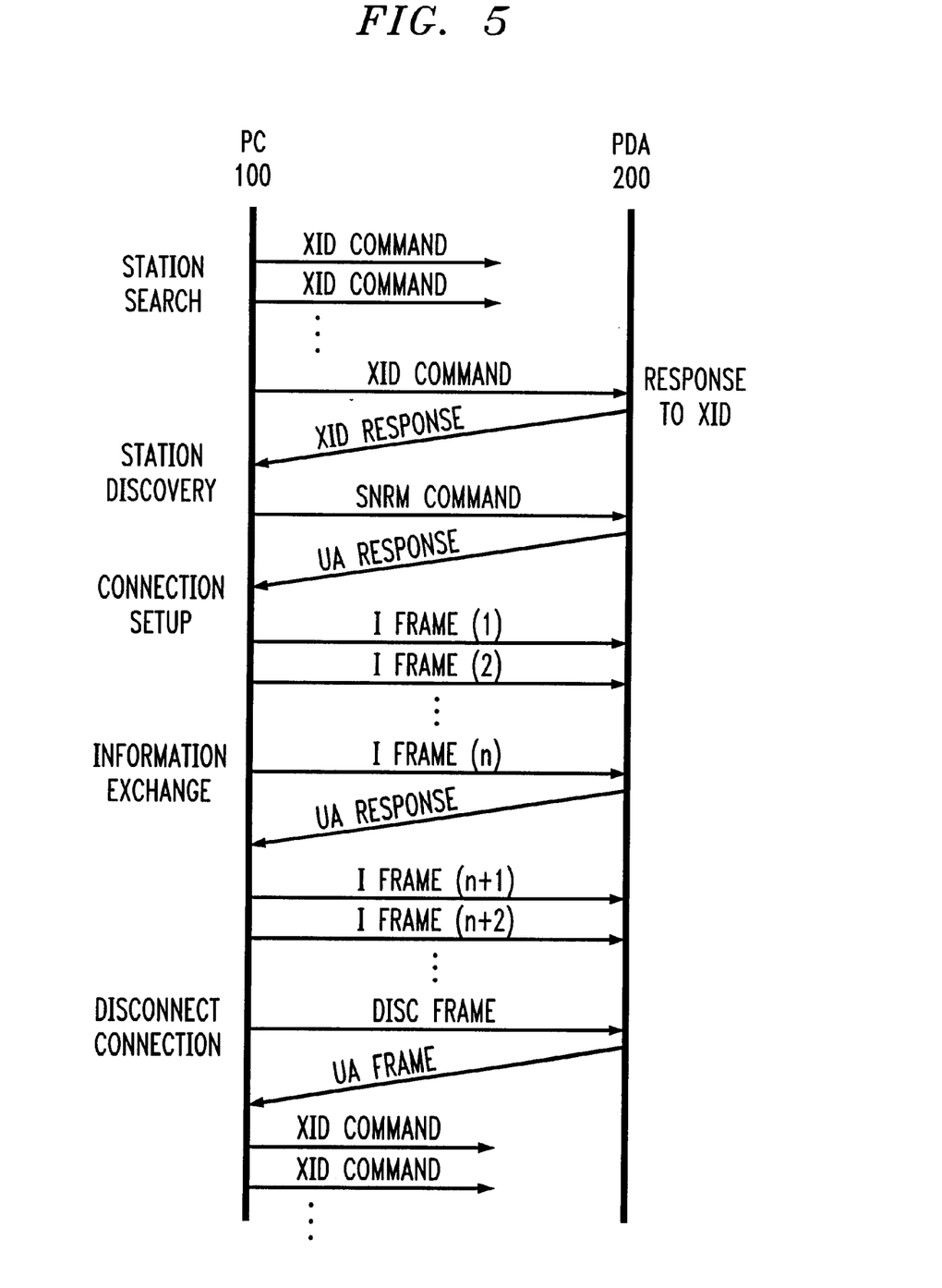
FIG. 5 is a schematic diagram showing transactions between PC 100 and PDA 200.

FIG. 5 schematically shows transactions between PC 100 and PDA 200 in an IR transfer.

Firstly, PC 100 continually transmits XID commands to search for a secondary station (PDA 200).

PDA 200, which comes within the visual field angles of IR transceiver 53 of PC 100, is responsive to an XID command to issue an XID response. As a result, PC 100 searches out PDA 200 as a secondary station.

Next, PC 100 transmits an SNRM frame for carrying setup content of a connection (e.g., a communication rate of a frame, a data size or the like). If the content of this SNRM frame is acceptable to PDA 200, it issues a UA response and implements the setup of this connection. Otherwise, PDA 200 issues a DM response and, as a result of this, the same connection setup procedure is repeated.

Once a connection between PC 100 and PDA 200 is established, both enter into a state where information can be exchanged. In the present embodiment, information transmission is substantially carried out in a unidirectional way from PC 100 to PDA 200. Namely, PC 100 transfers an I frame containing download data by an IR communication. In this case, PDA 200 returns a response to PC 100 whenever the timer times out, thereby to acknowledge receipt of the I frame between PC 100 and PDA 200. If PDA 200 has its own information to be transmitted, it returns an I frame as a response; otherwise, it issues a RR (Receive Ready) or RNR (Receive Not Ready) response.

Upon termination of download of predetermined data, PC 100 transmits a DISC frame to request disconnection. In this case, PDA 200 returns a UA response, thereby to establish disconnection.

After the connection is disconnected, PC 100 initializes the communication state, whereas PDA 200 terminates the communication state. However, PC 100 starts transmission of an XID command again to search for a station (PDA 200). This station search is continued unless the transmission state is explicitly reset by the user. Thus, when a user simply holds PDA 200 (or another PDA) that is set into the communication mode to PC 100 again, data download operations similar to those described above will be developed.

E. Appendix

In the above, this invention has been described in detail with reference to a specific embodiment. However, it should be understood that various changes or substitutions in the embodiment may be made by those skilled in the art without departing from the gist of this invention.

While the present embodiment has been described on the basis of the so-called PC/AT compatible machines ("PC/AT" is a trademark of IBM Corp.) conforming to the OADG specification, it is apparent that this invention may be implemented in other machines as well (e.g., PC 98 series of NEC Corp., Macintosh of Apple Computer, Inc. and compatible machines thereof).

Further, while the present embodiment has been described by taking the case of acquisition of Web data by a PDA, there is no doubt that this invention may apply to another data that may be acquired through a network (e.g., Lotus Notes, a file at an FTP (File Transfer Protocol) site, Gopher, NewsReader or the like).

In summary, this invention has been disclosed in an exemplary manner and, thus, this invention is not to be limited except as proscribed by the claims.

Advantages of the Invention

As described above in detail, in accordance with this invention, it is possible to provide an improved information processing apparatus and a method for controlling the same, which enables to smoothly transfer data, such as processed results obtain from execution of an application program, an HTML file acquired from a Web server in accordance with the TCP/IP protocol or the like, to an external device (PDA) by using an infrared communication function.

Further, in accordance with this invention, it is possible to provide an improved information processing apparatus and a method for controlling the same, which enables to smoothly transfer data, such as processed results obtained from execution of an application program, an HTML file acquired from a Web server in accordance with the TCP/IP protocol or the like, to an external device (PDA) by using a infrared communication function without imposing burdens on the external device.

We claim:

1. An information processing apparatus having an infrared communication function, comprising:
   an infrared transceiver for transmitting/receiving an infrared code;
   means for acquiring and storing data to be downloaded;
   input means for allowing a user to input user commands;
   means, responsive to a data download command from the user, for entering and staying in a station search state to transmit an infrared code to search for a destination station to which data is to be downloaded; and
   means for downloading data to the destination station, wherein the downloading data means is independent of a communications protocol associated with the acquiring means such that the destination station is not required to support the communications protocol of the acquiring means.

2. An information processing apparatus having an infrared communication function, comprising:
   an infrared transceiver for transmitting/receiving an infrared code;
   means for acquiring and storing data to be downloaded;
   input means for allowing a user to input user commands;
   means, responsive to a data download command from the user, for entering and staying in a station search state to transmit an infrared code to search for a destination station to which data is to be downloaded;
   means, responsive to receipt of an infrared code that indicates a response of station discovery from the destination station, for executing an infrared communication to transmit the download data, wherein the execution means is independent of a communication protocol associated with the acquiring means such that the destination station is not required to support the communications protocol of the acquiring means; and
   means, responsive to termination of the infrared communication with the destination station, for returning to the station search state.

3. A method of controlling an information processing apparatus having an infrared transceiver for transmitting/receiving an infrared code, a memory for storing download data, and input means for allowing a user to input user commands, comprising the steps of:
   acquiring data to be downloaded;
   responsive to a data download command from the user, entering and staying in a station search state to transmit an infrared code to search for a destination station to which data is to be downloaded data;
   responsive to receipt of an infrared code that indicates a response of station discovery from the destination station, executing an infrared communication to transmit the download data, wherein the execution operation is independent of a communications protocol associated with the acquisition operation such that the destination station is not required to support the communications protocol of the acquisition operation; and
   responsive to termination of the infrared communication with the destination station, returning to the station search state.

4. A method of controlling an information processing apparatus having an infrared transceiver for transmitting/receiving an infrared code, a memory for storing download data, and input means for allowing a user to input user commands, comprising the steps of:
   acquiring data to be downloaded;
   responsive to a data download command from the user, entering and staying in a station search state to transmit an infrared code to search for a destination station to which data is to be downloaded;
   responsive to receipt of an infrared code that indicates a response of station discovery from the destination station, executing an infrared communication to transmit the download data, wherein the execution operation is independent of a communications protocol associated with the acquisition operation such that the destination station is not required to support the communications protocol of the acquisition operation;
   responsive to termination of the infrared communication with the destination station, returning to the station search state; and
   responsive to a command from the user, exiting the station search state.

5. A computer readable storage medium for storing in a tangible form a computer program executable on a computer system comprising an infrared transceiver for transmitting/receiving an infrared code, a memory for storing download data, and input means for allowing a user to input user commands, said computer program comprising:
   a routine for acquiring data to be downloaded;
   a routine, responsive to a data download command from the user, for entering and staying in a station search state to transmit an infrared code to search for a destination station to which data is to be downloaded;
   a routine, responsive to receipt of an infrared code that indicates a response of station discovery from the decision station, for executing an infrared communication to transmit the download data, wherein the execution routine is independent of a communication protocol associated with the acquisition routine such that the destination station is not required to support the communications protocol of the acquisition routine; and
   a routine, responsive to termination of the infrared communication with the destination station, for returning to the station search state.

6. A computer readable storage medium for storing in a tangible form a computer program executable on a computer system comprising an infrared transceiver for transmitting/receiving an infrared code, a memory for storing download data, and input means for allowing a user to input user commands, said computer program comprising:
   a routine for acquiring data to be downloaded;
   a routine, responsive to a data download command from the user, for entering and staying in a station search state to transmit an infrared code to search for a destination station to which data is to be downloaded;
   a routine, responsive to receipt of an infrared code that indicates a response of station discovery from the destination station, for executing an infrared communication to transmit the download data, wherein the execution routine is independent of a communications protocol associated with the acquisition routine such that the destination station is not required to support the communications protocol of the acquisition routine;
   a routine, responsive to termination of the infrared communication with the destination station, for returning to the station search state; and
   a routine, responsive to a command from the user, for exiting the station search state.

7. An information processing apparatus having a wireless communication function, comprising:

a wireless transceiver for transmitting/receiving a wireless code;

means for acquiring data to be downloaded;

input means for allowing a user to input user commands;

means, responsive to a data download command from the user, for entering and staying in a station search state to transmit a wireless code to search for a destination to which data is to be downloaded; and means for downloading data to the destination station, wherein the downloading data means is independent of a communications protocol associated with the acquiring means such that the destination station is not required the communications protocol of the acquiring means.

8. An information processing apparatus having a wireless communication function, comprising:

a wireless transceiver for transmitting/receiving a wireless code;

means for acquiring data to be downloaded;

input means for allowing a user to input user commands;

means, responsive to a data download command from the user, for entering and staying in a station search state to transmit a wireless code to search for a destination station to which data is to be downloaded; and means, responsive to receipt of a wireless code that indicates a response of station discovery from the destination station, for executing a wireless communication to transmit the download data, wherein the execution means is independent of a communications protocol associated with the acquiring means such that the destination station is not required to support the communications protocol of the acquiring means; and means, responsive to termination of the wireless communication with the destination station, for returning to the station search state.

9. The information processing apparatus of claim 7, further comprising means, responsive to a command from the user, for exiting the station search state.

10. A method of controlling an information processing apparatus having a wireless transceiver for transmitting/receiving a wireless code, a memory for storing download data, and input means for allowing a user to input user commands, comprising the steps of:

acquiring data to be downloaded;

responsive to a data download command from the user, entering and staying in a station search state to transmit a wireless code to search for a destination station to which data is to be downloaded data;

responsive to receipt of a wireless code that indicates a response of station discovery from the destination station, executing a wireless communication to transmit the download data, wherein the execution operation is independent of a communications protocol associated with the acquisition operation such that the destination station is not required to support the communications protocol of the acquisition operation; and responsive to termination of the wireless communication with the destination station, returning to the station search state.

11. A method of controlling an information processing apparatus having a wireless transceiver for transmitting/receiving a wireless code, a memory for storing download data, and input means for allowing a user to input user commands, comprising the steps of:

acquiring data to be downloaded;

responsive to a data download command from the user, entering and staying in a station search state to transmit a wireless code to search for a destination station to which data is to be downloaded;

responsive to receipt of a wireless code that indicates a response of station discovery from the destination station, executing a wireless communication to transmit the download data, wherein the execution operation is independent of a communications protocol associated with the acquisition operation such that the destination station is not required to support the communications protocol of the acquisition operation;

responsive to termination of the wireless communication with the destination station, returning to the station search state; and responsive to a command from the user, exiting the station search state.

12. A computer readable storage medium for storing in a tangible form a computer program executable on a computer system comprising a wireless transceiver for transmitting/receiving a wireless code, a memory for storing download data, and input means for allowing a user to input user commands, said computer program comprising:

a routine for acquiring data to be downloaded;

routine, response to a data download command from the user, for entering and staying in a station search state to transmit a wireless code to search for a destination station to which data is to be downloaded;

a routine, responsive to receipt of a wireless code that indicates a response of station discovery from the destination station, for executing a wireless communication to transmit the download data, wherein the execution routine is independent of a communications protocol associated with the acquisition routine such that the destination station is not required to support the communications protocol of the acquisition routine; and a routine, responsive to termination of the wireless communication with the destination station, for returning to the station search state.

13. A computer readable storage medium for storing in a tangible form a computer program executable on a computer system comprising a wireless transceiver for transmitting/receiving a wireless code, a memory for storing download data, and input means for allowing a user to input user commands, said computer program comprising:

a routine for acquiring data to be downloaded;

a routine, responsive to a data download command from the user, for entering and staying in a station search state to transmit a wireless code to search for a destination station to which data is to be downloaded:

a routine, responsive to receipt of a wireless code that indicates a response of station discovery from the destination station, for executing a wireless communication to transmit the download data, wherein the execution routine is independent of a communications protocol associated with the acquisition routine such that the destination station is not required to support the communications protocol of the acquisition routine;

a routine, responsive to termination of the wireless communication with the destination station, for returning to the station search state; and a routine, responsive to a command from the user, for exiting the station search state.

14. An information processing apparatus having a wireless communication function, comprising:

a wireless transceiver for transmitting/receiving a wireless code;

means for acquiring web-based data to be downloaded;

input means for allowing a user to input user commands;

means, responsive to a data download command from the user, for entering and staying in a station search state to transmit a wireless code to search for a destination station to which data is to be downloaded; and means for downloading data to the destination station, wherein the downloading data means is independent of a web-based communications protocol associated with the acquisition means such that the destination station is not required to support the web-based communications protocol of the acquiring means.

* * * * *

UNITED STATES PATENT AND TRADEMARK OFFICE
CERTIFICATE OF CORRECTION

PATENT NO. : 6,336,142 B1
DATED : January 1, 2002
INVENTOR(S) : N. Kato et al.

It is certified that error appears in the above-identified patent and that said Letters Patent is hereby corrected as shown below:

<u>Title page,</u>
Item [56], References Cited, please list the following FOREIGN PATENT DOCUMENTS:

| | | |
|---|---|---|
| 9-506723 A | 06/30/97 | Japan |
| 9-16501 A | 01/17/97 | Japan |
| 8-16521 A | 01/19/96 | Japan |

Signed and Sealed this

Twentieth Day of August, 2002

*Attest:*

JAMES E. ROGAN
*Attesting Officer*  *Director of the United States Patent and Trademark Office*